United States Patent [19]

Ishi

[11] Patent Number: 5,625,627
[45] Date of Patent: Apr. 29, 1997

[54] MOBILE STATION APPARATUS AND BASE STATION APPARATUS

[75] Inventor: Haruhiko Ishi, Kawasaki, Japan

[73] Assignee: Fujitsu Limited, Kanagawa, Japan

[21] Appl. No.: 329,247

[22] Filed: Oct. 26, 1994

[30] Foreign Application Priority Data

Apr. 6, 1994 [JP] Japan ..................... 6-068248

[51] Int. Cl.$^6$ ........................................ H04J 3/16
[52] U.S. Cl. ........................ 370/347; 370/350; 455/33.1
[58] Field of Search .................... 370/95.1, 95.3, 370/100.1, 105, 103, 105.4, 105.5, 17; 455/63, 69, 54.1, 226.1, 33.1–33.4, 51.1, 52.1, 53.1, 56.1; 379/59, 60; 375/354, 358

[56] References Cited

U.S. PATENT DOCUMENTS

| | | | |
|---|---|---|---|
| 5,355,515 | 10/1994 | Sicher | 455/33.2 |
| 5,404,376 | 4/1995 | Dent | 375/200 |
| 5,471,649 | 11/1995 | Rees et al. | 455/67.4 |

FOREIGN PATENT DOCUMENTS 57176   1/1993   Japan .

*Primary Examiner*—Douglas W. Olms
*Assistant Examiner*—Ajit Patel

[57] ABSTRACT

A mobile station apparatus and a base station apparatus for carrying out mobile communications according to TDMA technique and time alignment control are provided, wherein a guard time of a signal transmitted from a mobile station is reduced to improve the transmission efficiency, and also instantaneous disconnection of data signal at the time of channel switching is shortened. A measuring unit measures the received electric field strength of a radio wave from a base station, and a readout unit reads a time alignment value from a correlation table stored in a storage unit, based on the received electric field strength measured by the measuring unit. The correlation table is obtained beforehand through measurement or the like, taking account of a correlation found between the received electric field strength and time alignment value. A transmitting unit transmits data to the base station according to transmission timing adjusted based on the time alignment value read by the readout unit. The correlation table may alternatively be stored in the base station, or where no correlation table is used, the time alignment value may be calculated.

19 Claims, 20 Drawing Sheets

| ELECTRIC FIELD STRENGTH RECEIVED BY MOBILE STATION | TIME ALIGNMENT VALUE |
|---|---|
| ~34 | 0 |
| 33~24 | 1 |
| 23~18 | 2 |
| 17~14 | 3 |
| 13~11 | 4 |
| 10~8 | 5 |
| 7~4 | 6 |

| ELECTRIC FIELD STRENGTH RECEIVED BY MOBILE STATION | TIME ALIGNMENT VALUE |
|---|---|
| ~34 | 0 |
| 33~24 | 1 |
| 23~18 | 2 |
| 17~14 | 3 |
| 13~11 | 4 |
| 10~8 | 5 |
| 7~4 | 6 |

FIG. 4

| | |
|---|---|
| NO. OF DIVISIONS OF ELECTRIC FIELD STRENGTH | 7 |
| RECEIVED ELECTRIC FIELD STRENGTH 0 | 3 4 |
| RECEIVED ELECTRIC FIELD STRENGTH 1 | 2 4 |
| RECEIVED ELECTRIC FIELD STRENGTH 2 | 1 8 |
| RECEIVED ELECTRIC FIELD STRENGTH 3 | 1 4 |
| RECEIVED ELECTRIC FIELD STRENGTH 4 | 1 1 |
| RECEIVED ELECTRIC FIELD STRENGTH 5 | 8 |
| RECEIVED ELECTRIC FIELD STRENGTH 6 | 4 |

F I G. 7

| STATION PARAMETER | DATA |
|---|---|
| ANTENNA HEIGHT OF BASE STATION | 50(m) |
| EFFECTIVE RADIATED POWER OF BASE STATION | 19(dBW) |

FIG. 9

| BASE STATION 41 | | BASE STATION 42 | |
|---|---|---|---|
| STATION IDENTIFICATION DATA | | STATION IDENTIFICATION DATA | |
| COLOR CODE | PERCH CHANNEL NO. | COLOR CODE | PERCH CHANNEL NO. |
| 1 | 3 | 2 | 5 |
| ELECTRIC FIELD STRENGTH RECEIVED BY SUBSTATION | TIME ALIGNMENT VALUE | ELECTRIC FIELD STRENGTH RECEIVED BY SUBSTATION | TIME ALIGNMENT VALUE |
| ～34 | 0 | ～30 | 0 |
| 33～24 | 1 | 29～20 | 1 |
| 23～18 | 2 | 19～14 | 2 |
| 17～14 | 3 | 13～10 | 3 |
| 13～11 | 4 | 9～7 | 4 |
| 10～8 | 5 | 6～4 | 5 |
| 7～4 | 6 | | |

FIG. 11

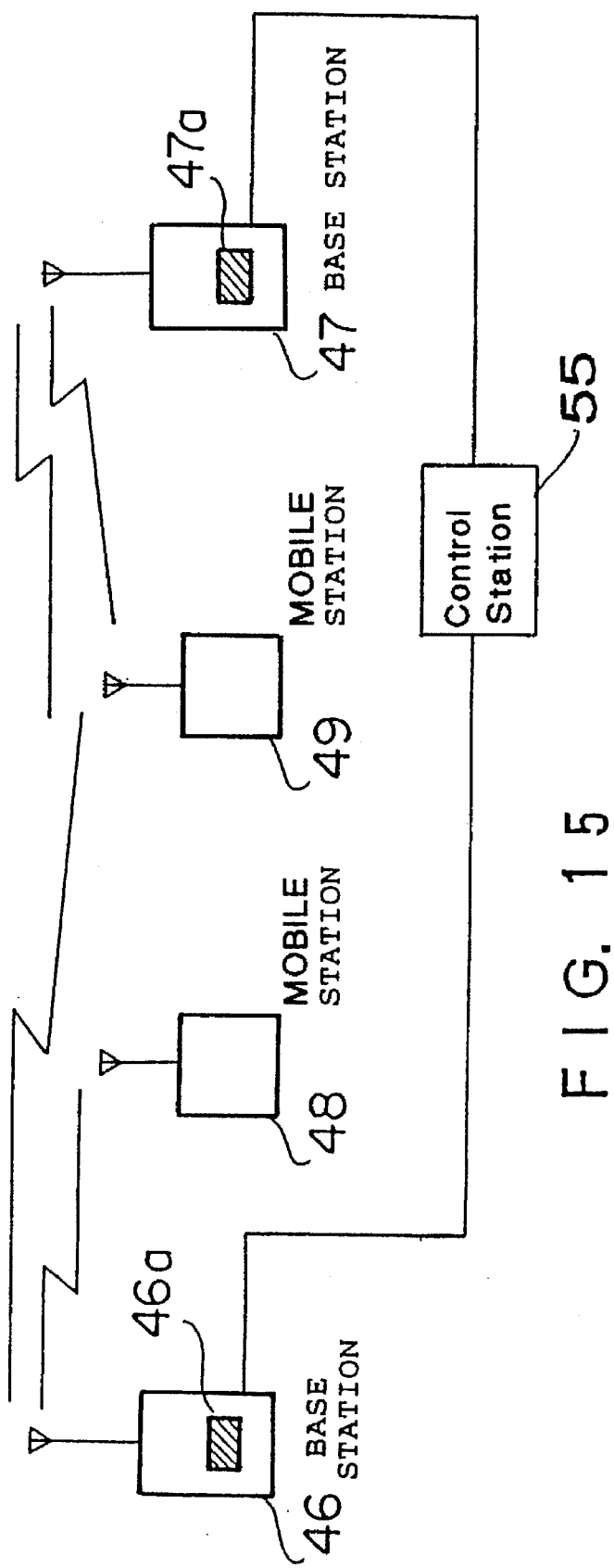
F I G. 15

| BASE STATION 4 6 | | BASE STATION 4 7 | |
|---|---|---|---|
| STATION IDENTIFICATION DATA | | STATION IDENTIFICATION DATA | |
| PERCH CHANNEL NO. | 1 2 6 | PERCH CHANNEL NO. | 3 8 |
| ELECTRIC FIELD STRENGTH RECEIVED BY SUBSTATION | TIME ALIGNMENT VALUE | ELECTRIC FIELD STRENGTH RACEIVED BY SUBSTATION | TIME ALIGNMENT VALUE |
| ~3 4 | 0 | ~3 0 | 0 |
| 3 3~2 4 | 1 | 2 9~2 0 | 1 |
| 2 3~1 8 | 2 | 1 9~1 4 | 2 |
| 1 7~1 4 | 3 | 1 3~1 0 | 3 |
| 1 3~1 1 | 4 | 9~7 | 4 |
| 1 0~8 | 5 | 8~4 | 5 |
| 7~4 | 6 | | |

FIG. 16

| BASE STATION | | BASE STATION | |
|---|---|---|---|
| STATION PARAMETER | DATA | STATION PARAMETER | DATA |
| PERCH CHANNEL NO. | 126 | PERCH CHANNEL NO. | 38 |
| ANTENNA HEIGHT | 50 (m) | ANTENNA HEIGHT | 50 (m) |
| EFFECTIVE RADIATED POWER | 19 (dBW) | EFFECTIVE RADIATED POWER | 14 (dBW) |

FIG. 18

MOBILE STATION APPARATUS AND BASE STATION APPARATUS

BACKGROUND OF THE INVENTION

(1) Field of the Invention

The present invention relates to a mobile station apparatus and a base station apparatus for carrying out mobile communications therebetween according to TDMA technique, and more particularly, to a mobile station apparatus and a base station apparatus improved in time alignment control which is executed during signal transmission from a plurality of mobile stations to a base station.

(2) Description of the Related Art

In recent years, digital communication technique permitting high-efficiency use of radio waves via radio communication channels has been attracting attention, and there is a demand for the application of TDMA control to such communication technique in order to achieve even more efficient use of the channels.

In digital radio communication systems using the TDMA control, time alignment control is performed on signals containing a speech signal and a control signal, called hereinafter "data signals" on a physical channel for communication so as to prevent the collision of transmitted waves from substations (mobile stations) using adjacent slots of the same channel. According to the time alignment control, a guard time, if provided for the data signals to prevent the collision of transmitted waves, occupies only a short time, thus preventing the transmission efficiency from being lowered.

In conventional time alignment control, a sequence of operations is performed wherein, first, a base station determines a time alignment value based on a synchronizing burst signal transmitted from a substation and transmits the determined value to the substation, and the substation then transmits a data signal according to transmission timing adjusted based on the alignment value transmitted thereto.

FIG. 20 illustrates a conventional time alignment control sequence, or more specifically, a sequence executed at the time of channel switching. In the figure, the numbers following "S" represent step numbers in the sequence.

It is here assumed that while a substation is communicating with a first base station via a communication channel (S1), a command to switch the communication from the first to second base station is transmitted from a control station (not shown) to the first and second base stations. In response to the command, the second base station transmits a synchronizing burst signal 1 to the substation (S2), and the first base station transmits a channel designation signal specifying the channel to be switched to, to the substation (S3). After receiving the synchronizing burst signal 1 from the second base station which is associated with the channel specified by the channel designation signal, the substation transmits a synchronizing burst signal 2 to the second base station to notify the same of the reception of the synchronizing burst signal 1 (S4). Since the synchronizing burst signal 2 is not subjected to time alignment control, a guard time is set at the beginning and end of the burst signal 2. For example, in the synchronizing burst signal composed of 280 bits, the first 54 bits and the last 78 bits individually serve as a guard time.

The second base station compares the reception time of the synchronizing burst signal 2 from the substation with original reception timing thereof, and sets the derived difference as a time alignment value (S5). The second base station then transmits a synchronizing burst signal 3 carrying the time alignment value to the substation (S6). On receiving the synchronizing burst signal 3, the substation transmits a synchronizing burst signal 4 to the second base station to notify the same of the reception of the burst signal 3 (S7). This synchronizing burst signal 4 also is not subjected to the time alignment control; therefore, a guard time is provided at the beginning and end of the burst signal 4.

On receiving the synchronizing burst signal 4, the second base station transmits a data signal to the substation (S8). The substation then transmits a data signal to the second base station according to transmission timing adjusted based on the time alignment value transmitted thereto by means of the synchronizing burst signal 3 (S9).

Thus, a switching of channels is completed, and since the time alignment control is executed, the second base station can receive the transmitted signal from the substation according to the original reception timing thereof.

The synchronizing burst signals 2 and 4, which are provided with the guard times, are each transmitted from the substation to the base station in synchronism with the time of reception of a corresponding down signal from the base station. Accordingly, where the distance between the base station and the substation is great and the delay of signal transmission via a radio channel is large, correspondingly long guard times must be set.

Although the foregoing describes the case where the synchronizing burst signal is provided with guard times, a call-out signal, call-in response signal and location registration request signal, which are conventionally transmitted from a substation via a control channel, also must be provided with guard times because these signals are not subjected to the time alignment control.

Meanwhile, there is a tendency for service zones of mobile radio communications to enlarge from a zone radius of 1–2 km to 20–30 km, and greater zones bring about increased delay of data transmission and require longer guard times. From the viewpoint of transmission efficiency, however, the guard time should be as short as possible. Accordingly, there is a demand for the application of time alignment control not only to various signals transmitted from a substation via the control channel, but also to the synchronizing burst signal transmitted via the communication channel.

When switching channels during communication, the sequence of time alignment value setting, shown in FIG. 20, must be executed in order to determine the time alignment value for a new channel to which the communication is to be switched. According to this sequence, however, normal communication by means of data signals is interrupted till Step S9, causing an instantaneous disconnection of the communication. The instantaneous disconnection lowers the speech quality and thus should desirably be as short as possible.

SUMMARY OF THE INVENTION

A first object of the present invention is to provide a mobile station apparatus and a base station apparatus wherein a guard time set for a signal transmitted from a substation is reduced to thereby improve the transmission efficiency.

A second object of the present invention is to provide a mobile station apparatus and a base station apparatus wherein the duration of instantaneous disconnection of data signals at the time of channel switching is reduced.

To achieve the above objects, there are provided three mobile station apparatuses each for carrying out mobile communications with a base station according to TDMA technique. The first mobile station apparatus comprises storage means for storing a correlation table indicating correlation between received electric field strength and time alignment value, measuring means for measuring a received electric field strength of a radio wave from the base station, readout means for reading a time alignment value from the correlation table stored in the storage means, based on the received electric field strength measured by the measuring means, and transmitting means for transmitting data to the base station according to transmission timing adjusted based on the time alignment value read by the readout means.

The second mobile station apparatus for carrying out mobile communications with a base station according to TDMA technique comprises receiving/storing means for receiving a correlation table indicating correlation between received electric field strength and time alignment value from the base station, and storing the received correlation table, measuring means for measuring a received electric field strength of a radio wave from the base station, readout means for reading a time alignment value from the correlation table stored in the receiving/storing means, based on the received electric field strength measured by the measuring means, and transmitting means for transmitting data to the base station according to transmission timing adjusted based on the time alignment value read by the readout means.

The third mobile station apparatus for carrying out mobile communications with a base station according to TDMA technique comprises receiving means for receiving, from the base station, data indicating transmission effective radiated power and antenna height of the base station, measuring means for measuring a received electric field strength of a radio wave from the base station, storage means for storing a transmission frequency of the base station, calculating means for calculating a time alignment value based on the transmission effective radiated power and the antenna height of the base station received by the receiving means, the received electric field strength measured by the measuring means, and the transmission frequency of the base station stored in the storage means, and transmitting means for transmitting data to the base station according to transmission timing adjusted based on the time alignment value calculated by the calculating means.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 4 is a diagram of a correlation table stored in a storage unit of each substation;

FIG. 7 is a diagram of a correlation table stored in a storage unit of a base station;

FIG. 9 is a diagram showing an example of base station parameters stored in the storage unit;

FIG. 11 is a diagram showing an example of correlation tables set for respective base stations and stored in the substation;

FIG. 15 is a block diagram schematically illustrating the configuration of a fifth embodiment;

FIG. 16 is a diagram showing an example of correlation tables stored in the storage unit of the base station;

FIG. 18 is a diagram showing an example of station parameters set for individual base stations and stored in the base station;

DESCRIPTION OF THE PREFERRED EMBODIMENTS

First, the principles underlying embodiments of the present invention will be explained.

Figure 1A:
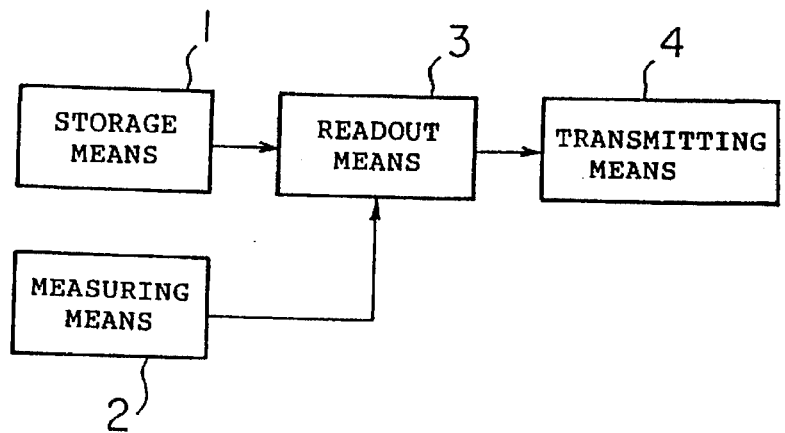
FIG. 1(A) is a diagram illustrating a first principle of the present invention.

As shown in FIG. 1(A), the present invention provides a mobile station apparatus comprising storage means 1 for storing a correlation table indicating correlation between received electric field strength and time alignment value, measuring means 2 for measuring the received electric field strength of a radio wave from a base station, readout means 3 for reading a time alignment value from the correlation table stored in the storage means 1, based on the received electric field strength measured by the measuring means 2, and transmitting means 4 for transmitting data to the base station according to transmission timing adjusted based on the time alignment value read by the readout means 3.

With this arrangement, the measuring means 2 measures the received electric field strength of a radio wave from the base station, and the readout means 3 reads a time alignment value from the correlation table stored in the storage means 1, based on the received electric field strength measured by the measuring means 2. The correlation table is previously obtained through measurement or the like, taking account of the fact that there is a correlation between the received electric field strength and the time alignment value.

The transmitting means 4 transmits data to the base station according to transmission timing adjusted based on the time alignment value read by the readout means 3.

Figure 1B:
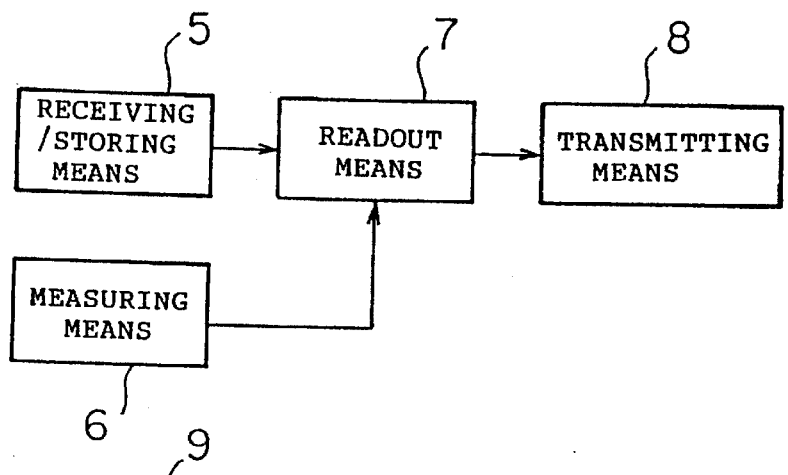
FIG. 1(B) is a diagram illustrating a second principle of the present invention.

As shown in FIG. 1(B), there is also provided a mobile station apparatus which comprises receiving/storing means 5 for receiving, from a base station, a correlation table indicating correlation between received electric field strength and time alignment value and storing the received correlation table, measuring means 6 for measuring the received electric field strength of a radio wave from the base station, readout means 7 for reading a time alignment value from the correlation table stored in the receiving/storing means 5, based on the received electric field strength measured by the measuring means 6, and transmitting means 8 for transmitting data to the base station according to transmission timing adjusted based on the time alignment value read by the readout means 7.

In the arrangement of FIG. 1(B), the receiving/storing means 5 receives and stores the time alignment value correlation table transmitted from the base station, and the measuring means 6 measures the received electric field strength of a radio wave from the base station. The readout means 7 reads a time alignment value from the correlation table stored in the receiving/storing means 5, based on the received electric field strength measured by the measuring means 6. The transmitting means 8 transmits data to the base station according to transmission timing adjusted based on the time alignment value read by the readout means 7.

Figure 1C:
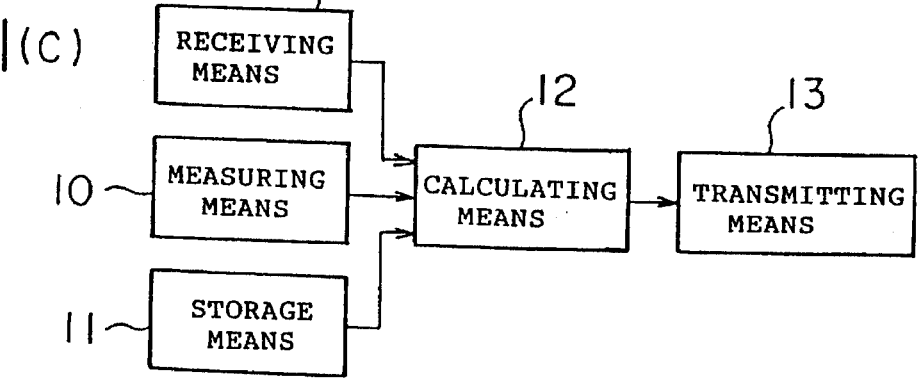
FIG. 1(C) is a diagram illustrating a third principle of the present invention.

Further, as shown in FIG. 1(C), the present invention provides a mobile station apparatus comprising receiving means 9 for receiving, from a base station, data indicating transmission effective radiated power and antenna height of the base station, measuring means 10 for measuring the received electric field strength of a radio wave from the base station, storage means 11 for storing the transmission frequency of the base station, calculating means 12 for calculating a time alignment value based on the transmission effective radiated power and the antenna height of the base station received by the receiving means 9, the received electric field strength measured by the measuring means 10, and the transmission frequency of the base station stored in the storage means 11, and transmitting means 13 for transmitting data to the base station according to transmission timing adjusted based on the time alignment value calculated by the calculating means 12.

According to the arrangement shown in FIG. 1(C), the receiving means 9 receives, from the base station, data indicating the transmission effective radiated power and antenna height of the base station, and the measuring means 10 measures the received electric field strength of a radio wave from the base station. The storage means 11 stores the transmission frequency of the base station. The calculating means 12 calculates a time alignment value based on the transmission effective radiated power and antenna height of the base station received by the receiving means 9, the received electric field strength measured by the measuring means 10, and the transmission frequency of the base station stored in the storage means 11, and the transmitting means 13 transmits data to the base station according to transmission timing adjusted based on the time alignment value calculated by the calculating means 12.

Thus, time alignment control can be performed on various signals transmitted from a mobile station via a control channel, as well as on a synchronizing burst signal transmitted from a mobile station via a communication channel at the time of channel switching. Consequently, a guard time, which is conventionally provided for these signals, can be shortened, and the transmission efficiency improved.

Figure 20:
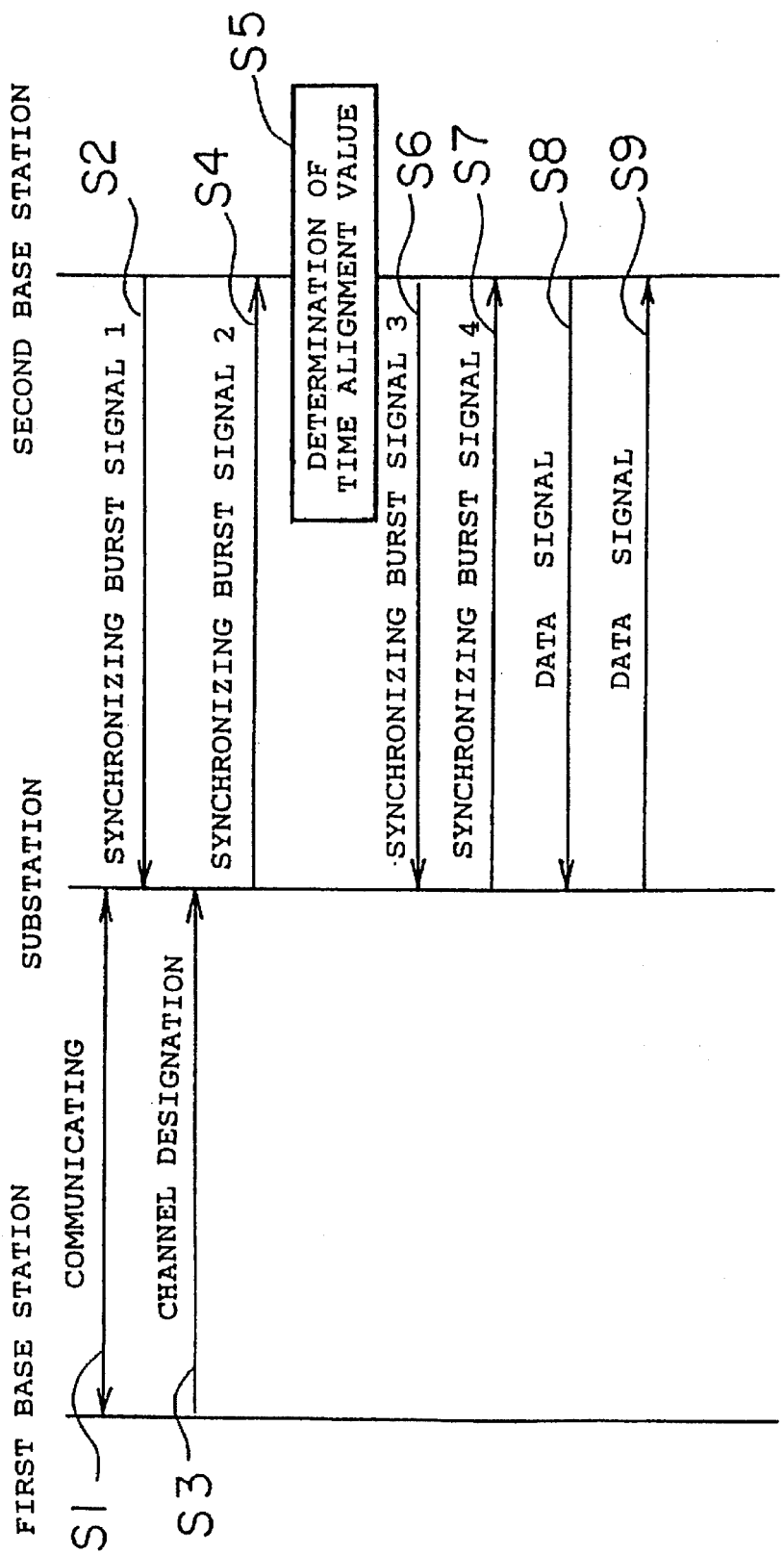
FIG. 20 is a diagram illustrating a conventional control sequence executed at the time of channel switching.

Further, when communication channels are switched, the above transmitting means 4, 8 and 13 each transmit a synchronizing burst signal to a base station which is associated with the channel to be switched to, in accordance with the aforementioned transmission timing. This means that the time alignment control is performed on the synchronizing burst signal 2 shown in FIG. 20; therefore, it is unnecessary to transmit the subsequent synchronizing burst signals 3 and 4 (the signals 3 and 4 are required if a correction value is to be obtained for fine time alignment control), and the sequence shown in FIG. 20 is shortened. Consequently, the duration of instantaneous disconnection of data signals at the time of channel switching can be shortened.

Embodiments of the present invention will be now described in detail.

Figure 2:
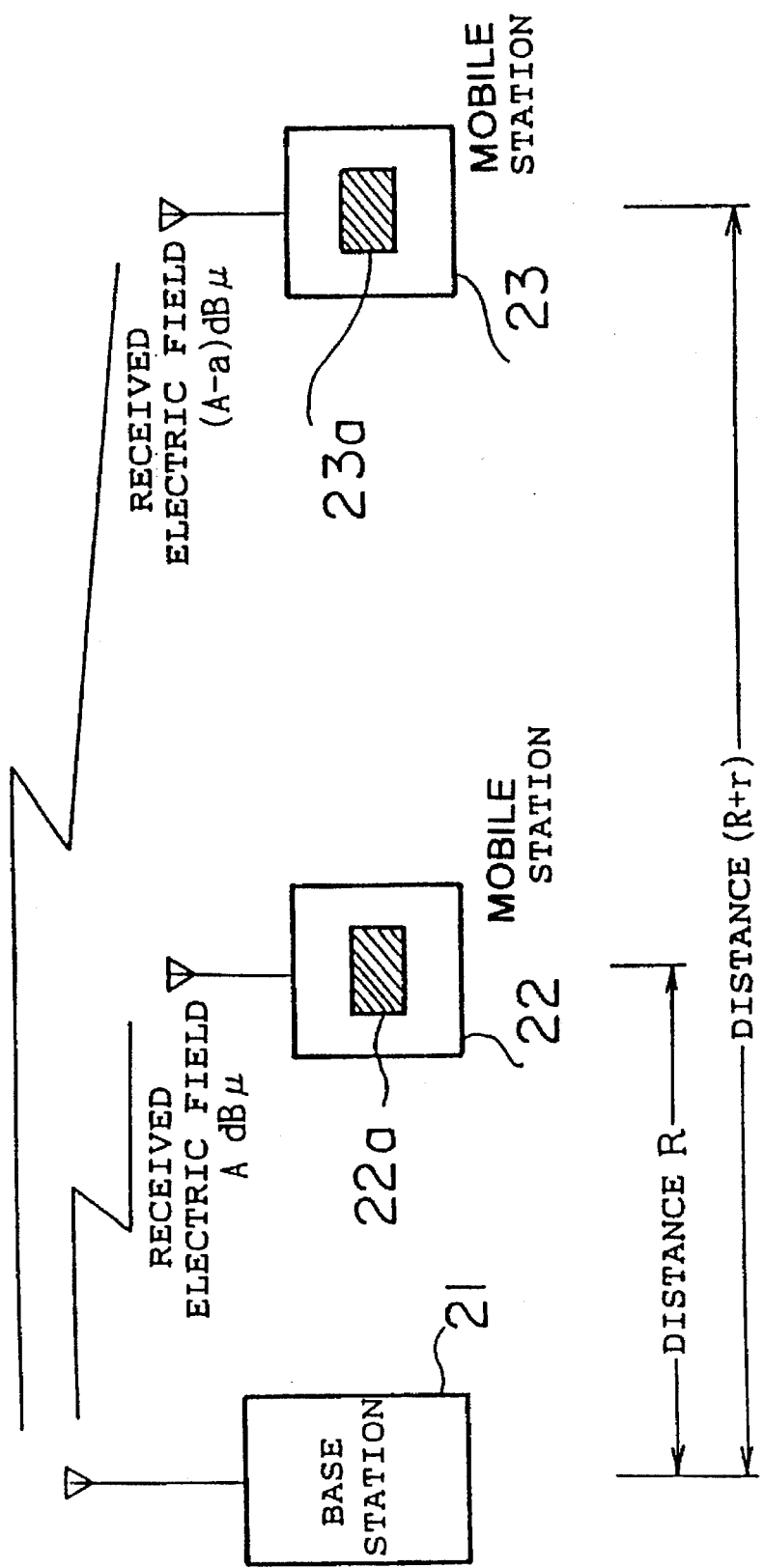
FIG. 2 is a block diagram schematically illustrating the configuration of a first embodiment.

FIG. 2 is a block diagram schematically illustrating the configuration of a first embodiment. In the figure, a base station 21 and substations (mobile stations) 22 and 23 carry out mobile communications according to TDM (time-division multiplex)/TDMA (time-division multiple access) technique, and constitute a digital automobile telephone system. It is here assumed that the mobile station 22 and 23 are located within the service area of the base station 21, the distance between the mobile station 22 and the base station 21 is R, and that the distance between the mobile station 23 and the base station 21 is (R+r). Generally, the farther a mobile station is located from the base station, the lower the electric field strength received by the mobile station becomes. Thus, given that a radio wave from the base station 21 has an electric field strength of AdBμ when received by the mobile station 22, the radio wave from the base station 21 has an electric field strength of (A−a)dBμ when received by the mobile station 23. Further, since the delay of radio wave increases with increase in the distance between the substation and the base station, the timing of radio wave transmission from the mobile station to the base station must be advanced by a value (time alignment value) corresponding to the delay. By carrying out the so-called time alignment control in this manner, a signal from a mobile station can be accurately transmitted to a predetermined time slot assigned to the mobile station, and can be prevented from colliding with signals transmitted to adjacent time slots from other mobile station.

The time alignment value has correlation with the distance between the mobile station and the base station, and this distance has correlation with the electric field strength received by the mobile station. Accordingly, there is correlation between the time alignment value and the electric field strength received by the mobile station. Taking this into account, a correlation table indicating the correlation between the time alignment value and the received electric field strength is created in advance, and is stored in each of storage units 22a and 23a of the mobile station 22 and 23. The method of creating such a correlation table will be described later with reference to FIG. 5.

Figure 3:
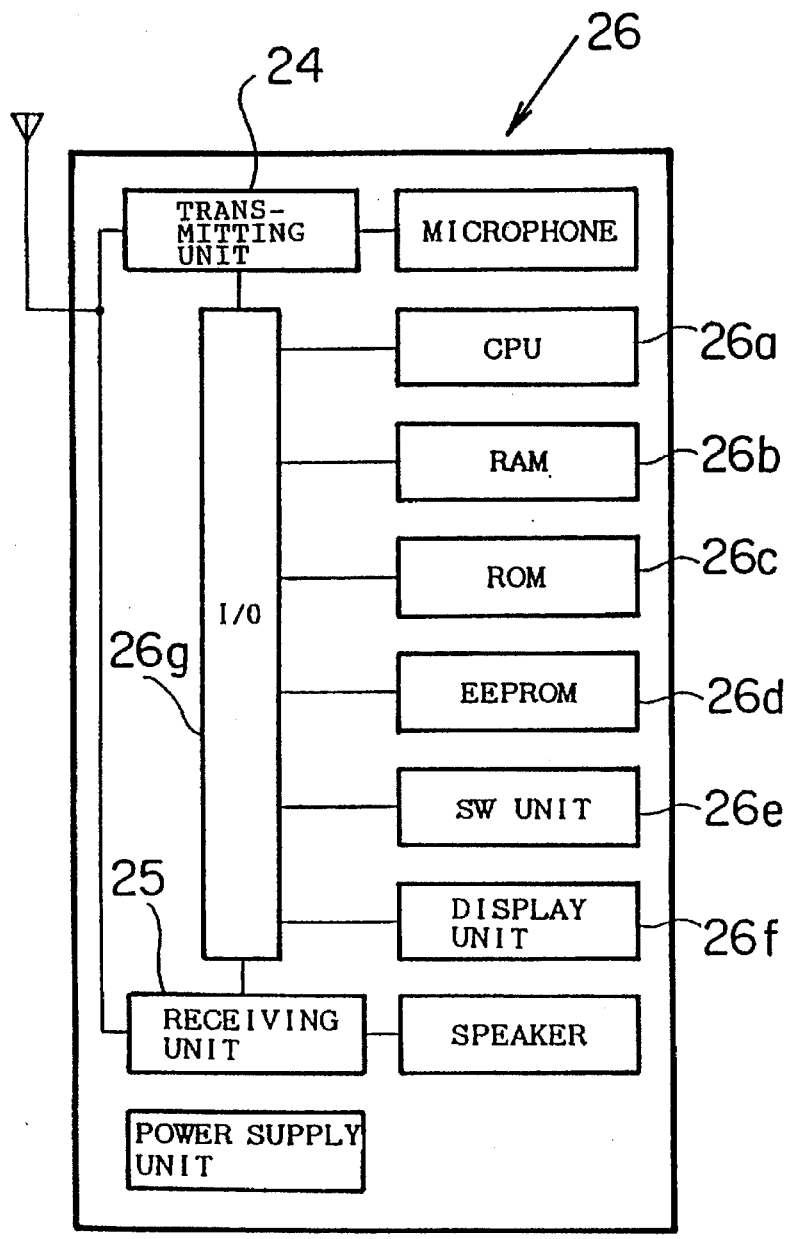
FIG. 3 is a block diagram illustrating the internal arrangement of a substation.

FIG. 3 is a block diagram illustrating the internal arrangement of the mobile station 22 and 23. The substations 22 and 23 have the same arrangement.

Specifically, the mobile station comprises a transmitting unit 24 connected to a microphone, a receiving unit 25 connected to a speaker, and a control unit 26 for controlling the operation of the transmitting unit 24 and the receiving unit 25. The control unit 26 includes a CPU 26a for executing programs, a RAM 26b for temporarily storing data, a ROM 26c storing processing programs and the like, an EEPROM 26d for storing the correlation table, station parameters and the like, an SW unit 26e through which external operations are input, a display unit 26f for displaying the output externally, and an I/O 26g for carrying out input/output interfacing. The transmitting unit 24, receiving unit 25, SW unit 26e and display unit 26f are connected to the CPU 26a, RAM 26b, ROM 26c and EEPROM 26d through the I/O 26g, and the CPU 26a is connected via a bus to the RAM 26b, ROM 26c and EEPROM 26d.

The storage units 22a and 23a of the mobile station 22 and 23 shown in FIG. 2 correspond to the EEPROM 26d.

FIG. 4 shows an example of the correlation table stored in each of the storage units 22a and 23a of the mobile station 22 and 23. In the table, the unit of the received electric field strength is dBμ, and the unit of the time alignment value is symbol.

Figure 5:
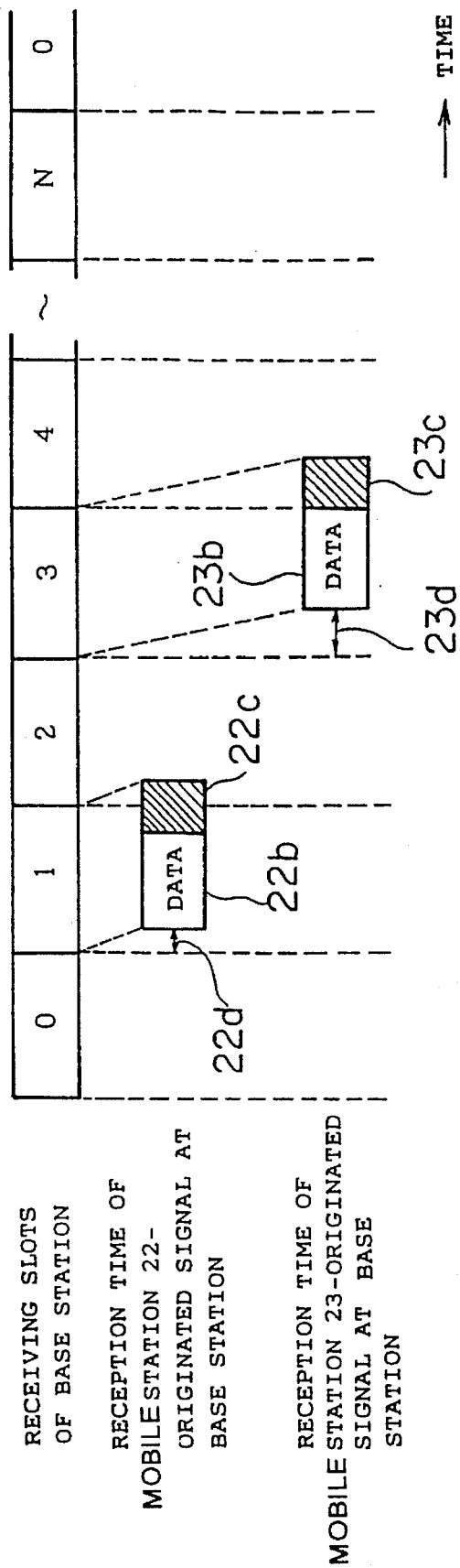
FIG. 5 is a diagram illustrating a method of setting a time alignment value.

FIG. 5 illustrates the method of setting the time alignment value. It is assumed that the base station 21 has (N+1) slots for receiving data transmitted from mobile station, wherein a slot 1 is assigned to data 22b transmitted from the mobile station 22 and a slot 3 is assigned to data 23b transmitted from the mobile station 23. In this case, provided the data 22b is transmitted from the mobile station 22 at the beginning of the slot 1 and the data 23b is transmitted from the mobile station 23 at the beginning of the slot 3, these data are received by the base station 21 at the times shown in FIG. 5, due to radio channel delay. Owing to the delay, the transmitted data 22b and 23b may possibly overlap with the subsequent slots. To avoid this, conventionally the amount of the data 22b and 23b is reduced and guard times 22c and 23c are provided.

According to the present invention, the difference in time between the beginning of the slot 1 and the reception of the transmitted data 22b by the base station 21 (the delay time of the transmitted data 22b dependent upon the distance R from the mobile station 22 to the base station 21) is set as a time alignment value 22d for the mobile station 22. Similarly, the difference in time between the beginning of the slot 3 and the reception of the transmitted data 23b by the base station 21 (the delay time of the transmitted data 23b dependent upon the distance R+r from the mobile station 23 to the base station 21) is set as a time alignment value 23d for the mobile station 23. If the transmissions of the data 22b and 23b from the respective mobile station 22 and 23 are advanced by the time alignment values 22d and 23d, respectively, the data 22b and 23b reach the slots 1 and 3 accurately, making it possible to greatly shorten the guard times for collision prevention.

To create the correlation table, the electric field strength received by a mobile station is previously measured at various points in the service area and also the distance from the mobile station to the base station is obtained. Then, a radio channel delay dependent upon the distance is calculated, and the time alignment value is set corresponding to the magnitude of the delay. In this manner, the correlation table indicating the correlation between the received electric field strength and the time alignment value is obtained.

With the arrangement described above, in the case of notifying the base station 21 of call-out, call-in response, or location registration request via a control channel, the mobile station 22, for example, measures the electric field strength of the radio wave received from the base station 21, reads a time alignment value from the correlation table stored in the storage unit 22a on the basis of the measured electric field strength, and transmits a call-out signal, call-in response signal, or location registration request signal to the base station 21 according to the transmission timing adjusted by the time alignment value.

Accordingly, the data 22b, which may be a call-out signal, call-in response signal or location registration request signal, is transmitted accurately to the slot 1, and even if almost no guard time is provided for the transmitted data 22b, the data 22b is prevented from colliding with data transmitted to the slot 2.

Figure 6:
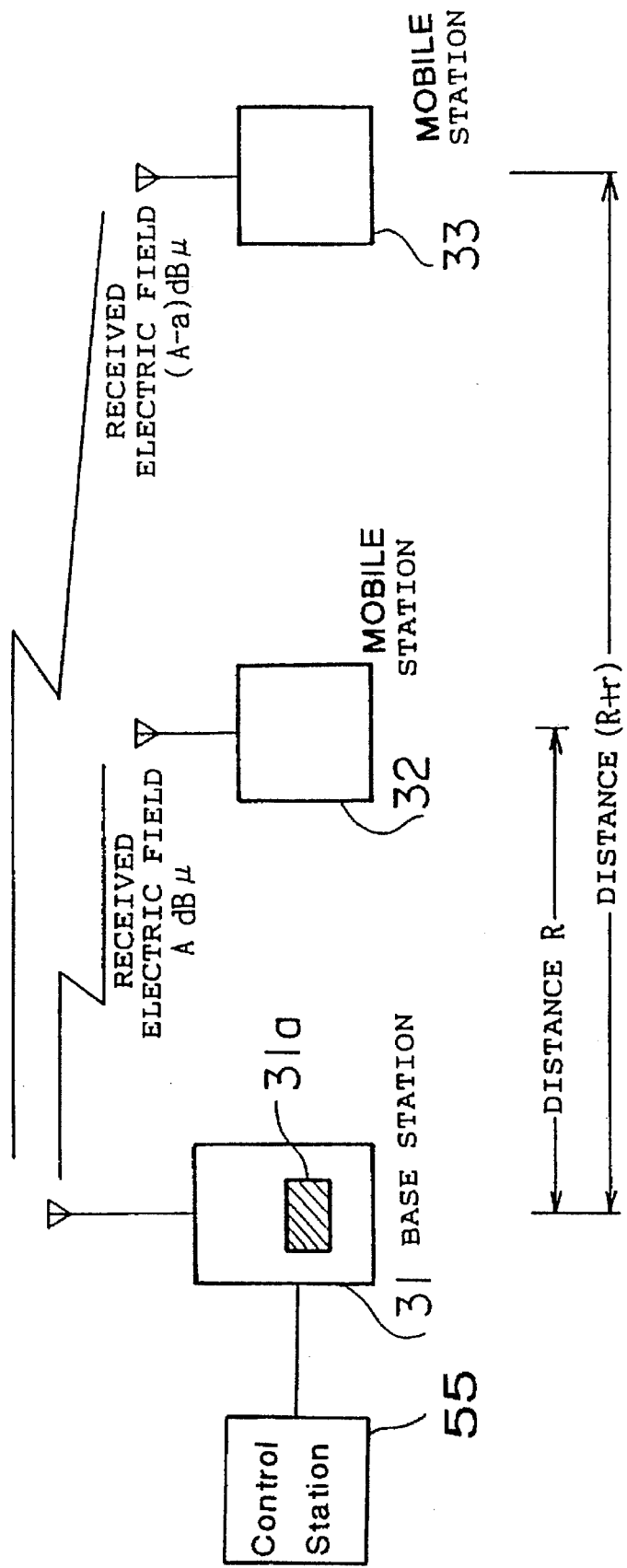
FIG. 6 is a block diagram schematically illustrating the configuration of a second embodiment.

FIG. 6 is a block diagram schematically illustrating the configuration of a second embodiment. In the figure, a base station 31 and mobile station 32 and 33 carry out mobile communications according to TDM/TDMA technique, and constitute a digital automobile telephone system. The mobile station 32 and 33 have an internal arrangement identical to that shown in FIG. 3. The mobile station 32 and 33 are located within the service area of the base station 31.

Also in the second embodiment, a correlation table indicating the correlation between the received electric field strength and the time alignment value is created in advance. The correlation table is stored in a storage unit 31a of the base station 31. The method of creating the correlation table is the same as that explained with reference to the first embodiment.

FIG. 7 shows an example of the correlation table stored in the storage unit 31a of the base station 31. In the table, "RECEIVED ELECTRIC FIELD STRENGTH 0–34" indicates that, for a received electric field strength of 34 dBμ or more, a time alignment value of "0" (symbol) is applied. Likewise, "RECEIVED ELECTRIC FIELD STRENGTH 1–24" indicates that, for a received electric field strength ranging from 33 to 24 dBμ, a time alignment value of "1" (symbol) is employed, and "RECEIVED ELECTRIC FIELD STRENGTH 2–18" indicates that, for a received electric field strength ranging from 23 to 18 dBμ, a time alignment value of "2" (symbol) is used.

Referring again to FIG. 6, the base station 31 transmits an informative signal containing the correlation table data to the mobile station 32 and 33 via the control channel. On receiving the informative signal, the mobile station 32 and 33 each store the correlation table data in a built-in RAM (corresponding to the RAM 26b shown in FIG. 3). The informative signal is a signal transmitted from the base station to the substations and containing, for example, information about control channel configuration, information about the determination of waiting channels, and information about regulations.

When notifying the base station 31 of call-out, call-in response, or location registration request via the control channel, the mobile station 32, for example, measures the electric field strength of the radio wave received from the base station 31, reads a time alignment value from the correlation table stored in the RAM on the basis of the measured electric field strength, and transmits a call-out signal, call-in response signal, or location registration request signal to the base station 31 according to the transmission timing adjusted by the time alignment value.

Accordingly, the call-out signal, call-in response signal or location registration request signal is transmitted accurately to a predetermined slot, and even if almost no guard time is provided for these signals, the signals are prevented from colliding with data transmitted to adjacent slots.

Figure 8:
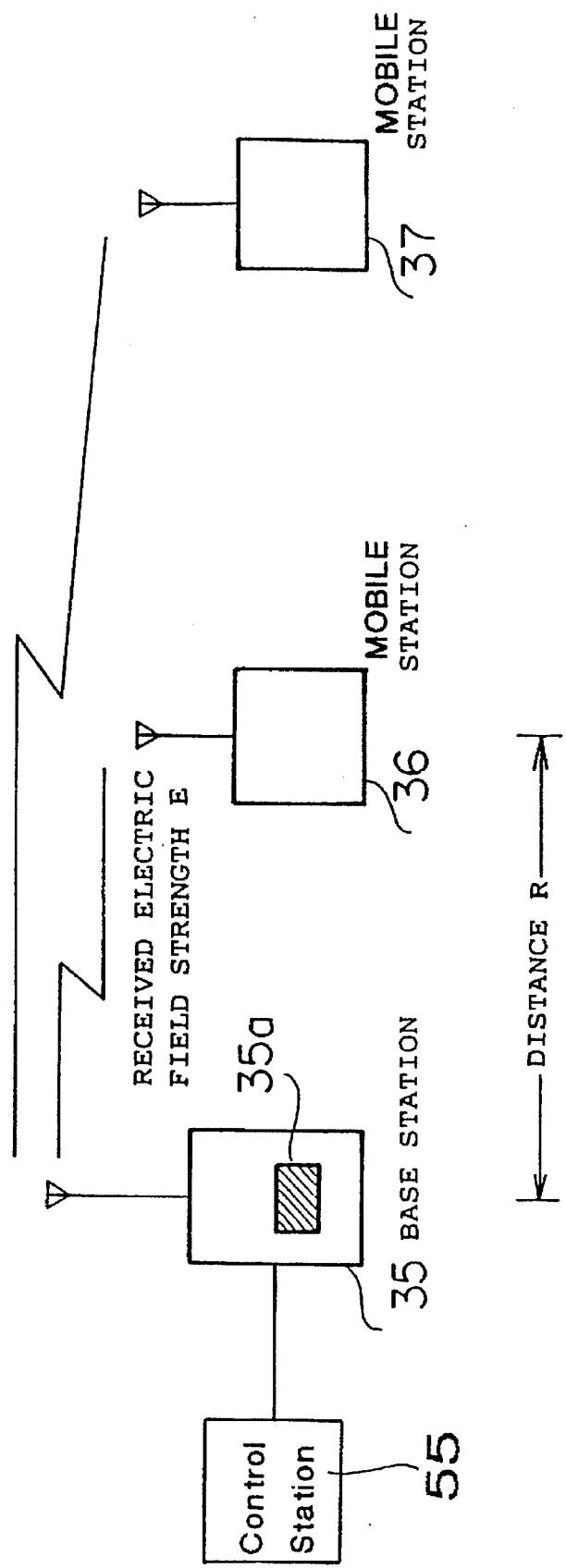
FIG. 8 is a block diagram schematically illustrating the configuration of a third embodiment.

FIG. 8 is a block diagram schematically illustrating the configuration of a third embodiment. In the figure, a base station 35 and mobile station 36 and 37 carry out mobile communications according to TDM/TDMA technique, and constitute a digital automobile telephone system. The mobile station 36 and 37 have an internal arrangement identical to that shown in FIG. 3, and data representing the transmission frequency of the base station 35 is stored in the EEPROM of each mobile station. The mobile station 36 and 37 are located within the service area of the base station 35.

In the third embodiment, the base station 35 has its own station parameters stored in a storage unit 35a thereof. The station parameters include an antenna height and effective radiated power value of the base station 35. FIG. 9 shows an example of such base station parameters stored in the storage unit 35a.

The base station 35 transmits an informative signal containing the station parameters to the mobile station 36 and 37 via the control channel. On receiving the informative signal, the mobile station 36 and 37 each store the station parameters in a built-in RAM (corresponding to the RAM 26b shown in FIG. 3).

When notifying the base station 35 of call-out, call-in response, or location registration request via the control channel, the mobile station 36, for example, measures the electric field strength of the radio wave received from the base station 35, reads the transmission frequency of the base station 35 stored in the EEPROM, reads the station parameters stored in the RAM, and calculates a time alignment value in the manner described below. Then, the mobile station 36 transmits a call-out signal, call-in response signal, or location registration request signal to the base station 35 according to the transmission timing adjusted by the time alignment value.

Accordingly, the call-out signal, call-in response signal or location registration request signal is t5 transmitted accurately to a predetermined slot, and even if almost no guard time is provided for these signals, the signals are prevented from colliding with data transmitted to adjacent slots.

The method of calculating the time alignment value is explained below. Specifically, provided the distance between the substation and the base station is R (km), the electric field strength of the base station-originated radio wave received by the substation is E (dBµV/m), the transmission frequency of the base station is f (MHz), the height of the antenna of the base station is h1 (m), and the height of the antenna of the substation is h2 (m), then the effective radiated power ERP (dBW) of the base station is given by equation (1) below.

$$ERP = E - (109.3 + 20 \log f - Lp) \quad (1)$$

Lp in equation (1) is given by the following equation (2):

$$Lp = 69.55 + 26.16 \log f - 13.82 \log h_1 - a(h_2) + (44.9 - 6.55 \log h_1) \log R \quad (2)$$

In equation (2), a(h₂) is given by the following equation (3):

$$a(h2) = (1.11 \log f - 0.7)h_2 - (1.56 \log f - 0.8) \quad (3)$$

Given that the antenna height h₂ of the substation is 1.5 m, the substation 36 can calculate the distance R according to the above equations (1), (2) and (3), because real numbers are given for all terms in these equations except for the distance R.

Then, using the calculated distance R, a delay time T (sec) is computed according to equation (4) below.

$$2R = 3.0 \times 10^5 \times T \quad (4)$$

Provided that the unit time of the time alignment control is x (sec), the time alignment value y (symbol) is given by the following equation (5):

$$y = T/x \text{(figures below the decimal point are ignored)} \quad (5)$$

For example, where the delay time T is 200 µsec and the unit time x is 47 µsec, the time alignment value y is 4 (symbol).

Figure 10:
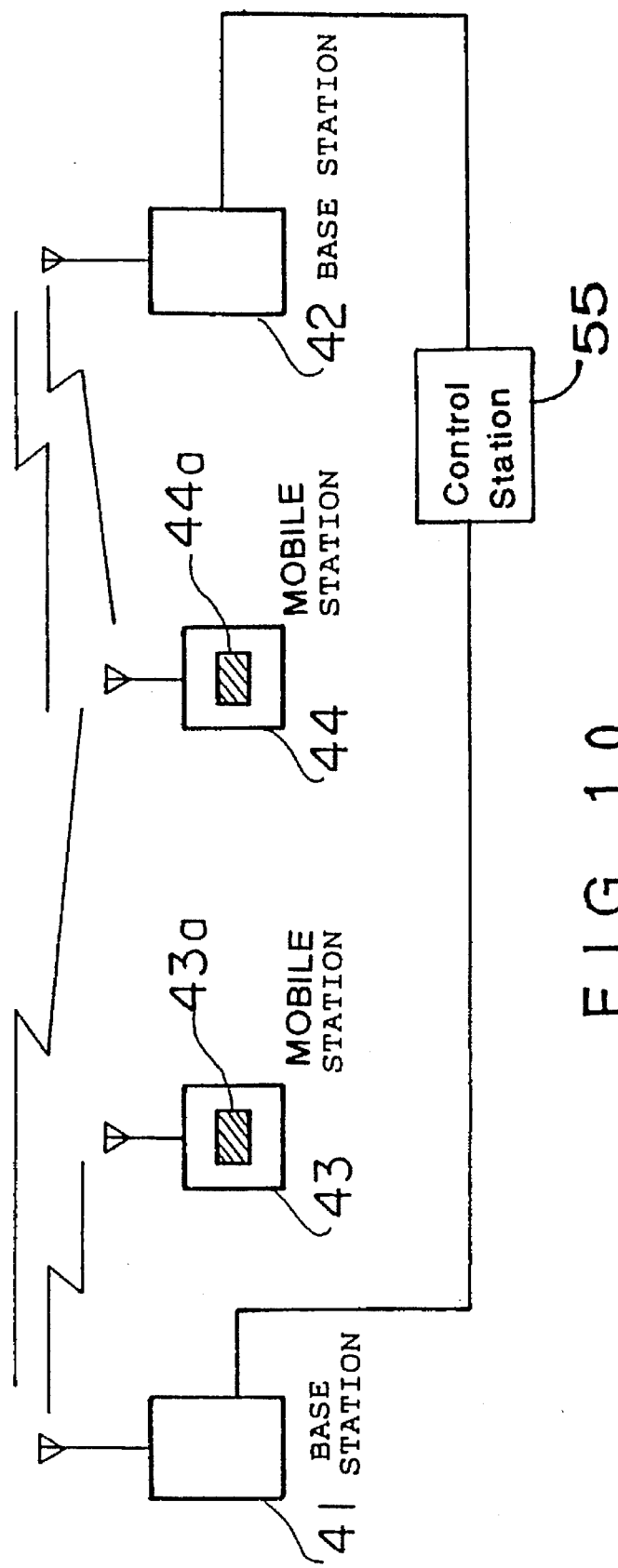
FIG. 10 is a block diagram schematically illustrating the configuration of a fourth embodiment.

FIG. 10 is a block diagram schematically illustrating the configuration of a fourth embodiment. In the fourth embodiment, figure illustrates the case where radio waves from a plurality of base stations are receivable by a mobile station. Specifically, base stations 41 and 42 are located adjacent to each other, and mobile station 43 and 44 are located within the coverage of service area of both base stations.

The base stations 41 and 42 and the mobile station 43 and 44 carry out mobile communications according to TDM/TDMA technique, and constitute a digital automobile telephone system. The mobile station 43 and 44 have an internal arrangement identical to that shown in FIG. 3.

The substations 43 and 44 include storage units 43a and 44a, respectively (corresponding to the EEPROM 26d shown in FIG. 3), in each of which time alignment correlation tables associated with the respective base stations 41 and 42 are stored. FIG. 11 shows an example of such correlation tables stored in each of the mobile station 43 and 44 in relation to the respective base stations.

Figure 12:
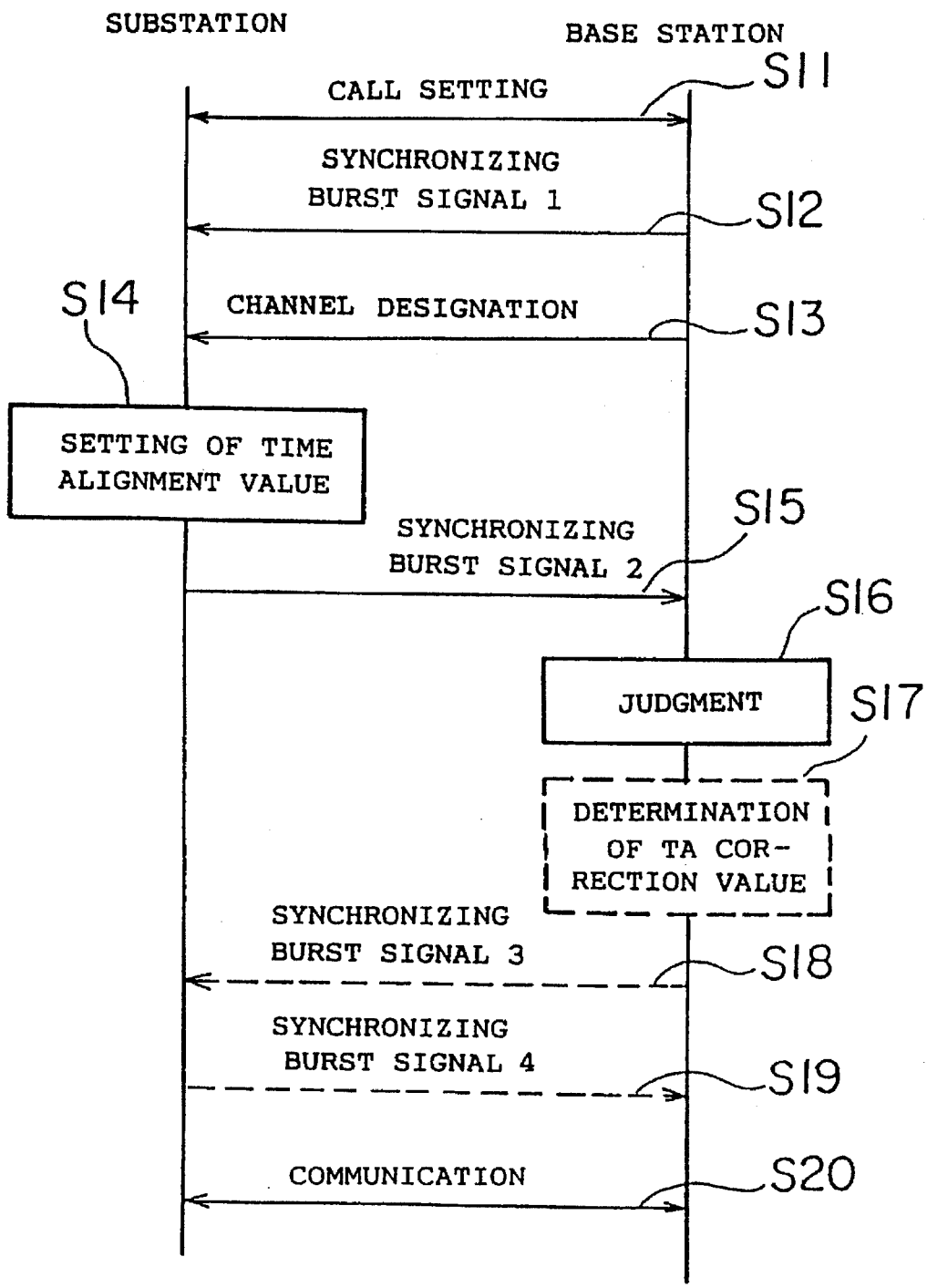
FIG. 12 is a diagram illustrating a control sequence executed at the time of call-out operation.

FIG. 12 illustrates a control sequence executed by the system described above at the time of call-out. Namely, when a call-out signal is transmitted from a mobile station to a base station, it is first subjected to the time alignment control before being transmitted to the base station. The control sequence executed at this time is explained with reference to FIG. 12. In the figure, the numbers following "S" denote step numbers in the sequence.

First, while in a wait state, the mobile station measures the received electric field strengths of radio waves then receivable from base stations. When a call-out is required, the mobile station transmits a call setting to a base station via the control channel (S11). The receiving base station notifies the call setting to a control station 55, and in accordance with a command from the control station, transmits a synchronizing burst signal 1 to the mobile station (S12). Also, the base station transmits a channel designation signal to the mobile station (S13). The channel designation signal includes a color code, a perch channel number, etc. On receiving the channel designation signal, the mobile station selects a correlation table for a base station associated with the channel specified by the channel designation signal, from among the correlation tables stored in the EEPROM thereof, and reads a time alignment value corresponding to the measured value of electric field strength of the radio wave received from that base station (S14). The base station associated with the channel specified by the channel designation signal may differ from the base station to which the mobile station has transmitted the call setting; in FIG. 12, it is assumed that these base stations are the same.

Subsequently, the mobile station transmits a synchronizing burst signal 2 to the base station to notify the same of the reception of the synchronizing burst signal 1, according to transmission timing adjusted based on the time alignment value obtained in Step S14 (S15). In this manner, the time alignment control is performed on the synchronizing burst signal 2, and therefore, it is almost unnecessary to set a collision prevention guard time for the synchronizing burst signal 2. The synchronizing burst signal 2 transmitted to the base station includes the time alignment value used for the time alignment control.

On receiving the synchronizing burst signal 2 from the mobile station, the base station compares the reception time of this signal with original reception timing thereof, and determines whether the transmission timing of the mobile station is proper (S16). Namely, although the synchronizing burst signal 2 has already been subjected to the time alignment control, there may be a difference between the actual reception timing and the original reception timing on the part of the base station, due to a small time lag attributable to the time alignment control. To eliminate this, the timing comparison is made. In other words, it is determined whether or not a data signal, if transmitted from the mobile station on the basis of the time alignment value according to which the transmission timing of the synchronizing burst signal 2 has been adjusted, will influence the communications of other mobile station via adjacent slots of the same channel.

If it is judged that the transmission timing of the mobile station is proper, Steps S17 to S19 are skipped; accordingly, the base station transmits a data signal to the mobile station, and the mobile station transmits a data signal to the base station according to the transmission timing adjusted based on the above time alignment value, whereby communication is established (S20). In practice, Step S20 includes calling, responding, response confirmation, etc. executed prior to the communication, but these operations are omitted.

If it is judged in Step S16 that the transmission timing of the mobile station is not proper, a time alignment correction value is obtained such that the reception timing of the base station coincides with the original reception timing (S17). The time alignment correction value is explained with reference to FIG. 13.

Figure 13:
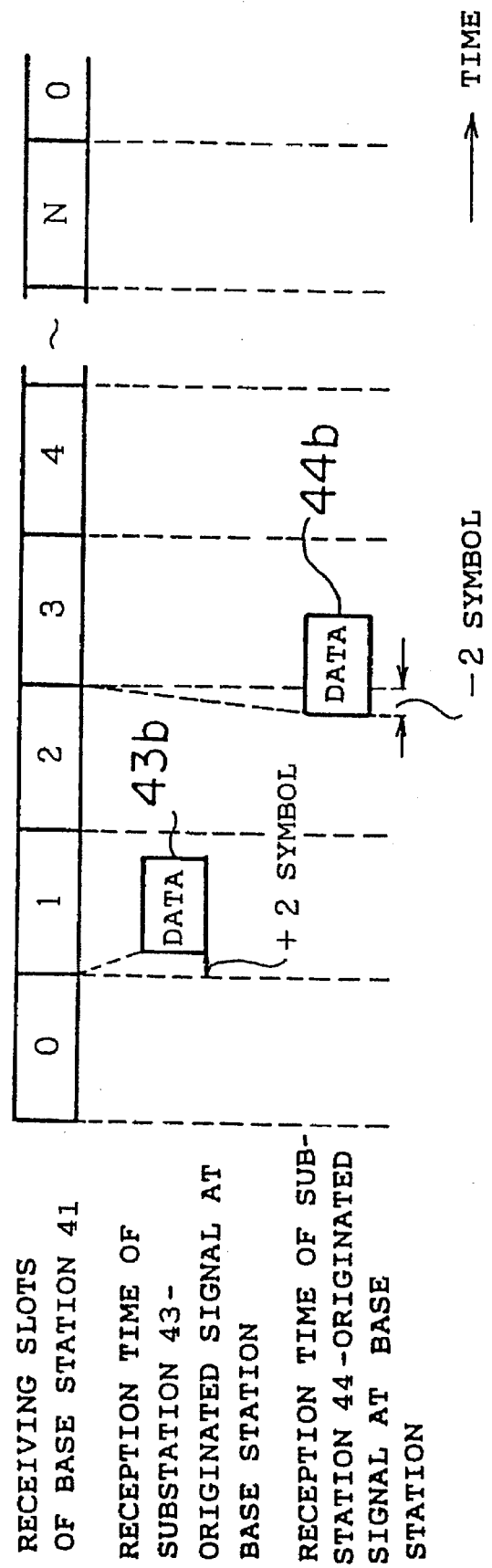
FIG. 13 is a diagram illustrating a method of setting a time alignment correction value.

FIG. 13 illustrates the method of setting the time alignment correction value. The description below is based on the assumption that the base station 41 receives data 43b and 44b transmitted from the mobile station 43 and 44, respectively. It is also assumed that the data 43b was transmitted from the mobile station 43 according to the transmission timing adjusted based on the time alignment value "3" (symbol) but was received by the base station 41 with a time delay equivalent to "2" (symbol) as shown in FIG. 13, and that the data 44b was transmitted from the mobile station 44 according to the transmission timing adjusted based on the time alignment value "5" (symbol) but was received by the base station 41 at an advanced time equivalent to "2" (symbol) as shown in the same figure. In this case, the base station 41 sets the time alignment correction value "+2" ( symbol ) for the mobile station 43, and sets the time alignment correction value "−2" (symbol) for the substation 44.

Referring again to FIG. 12, the base station transmits a synchronizing burst signal 3 which contains the time alignment correction value thus set, to the corresponding mobile station (S18). The mobile station then transmits a synchronizing burst signal 4 to the base station to notify the same of the reception of the time alignment correction value (S19). The transmission timing of this synchronizing burst signal 4 is adjusted based solely on the time alignment value set in Step S14, and the time alignment correction value set in Step S18 is not yet reflected. Then, communication is established in Step S20, as mentioned above, in which case the mobile station carries out signal transmission according to transmission timing which is adjusted based on a corrected time alignment value reflecting the time alignment correction value. Specifically, in the example of FIG. 13, the mobile station 43 transmits data according to transmission timing adjusted based on the time alignment value "5 (=3+2)" (symbol), and the mobile station 44 transmits data according to transmission timing adjusted based on the time alignment value "3 (=5−2)" (symbol).

In Step S17, after the time alignment correction value is obtained, it may be added to the time alignment value received in Step S15, to obtain a corrected time alignment value. In this case, in Step S18, a synchronizing burst signal 3 carrying the corrected time alignment value is transmitted to the mobile station.

Figure 14:
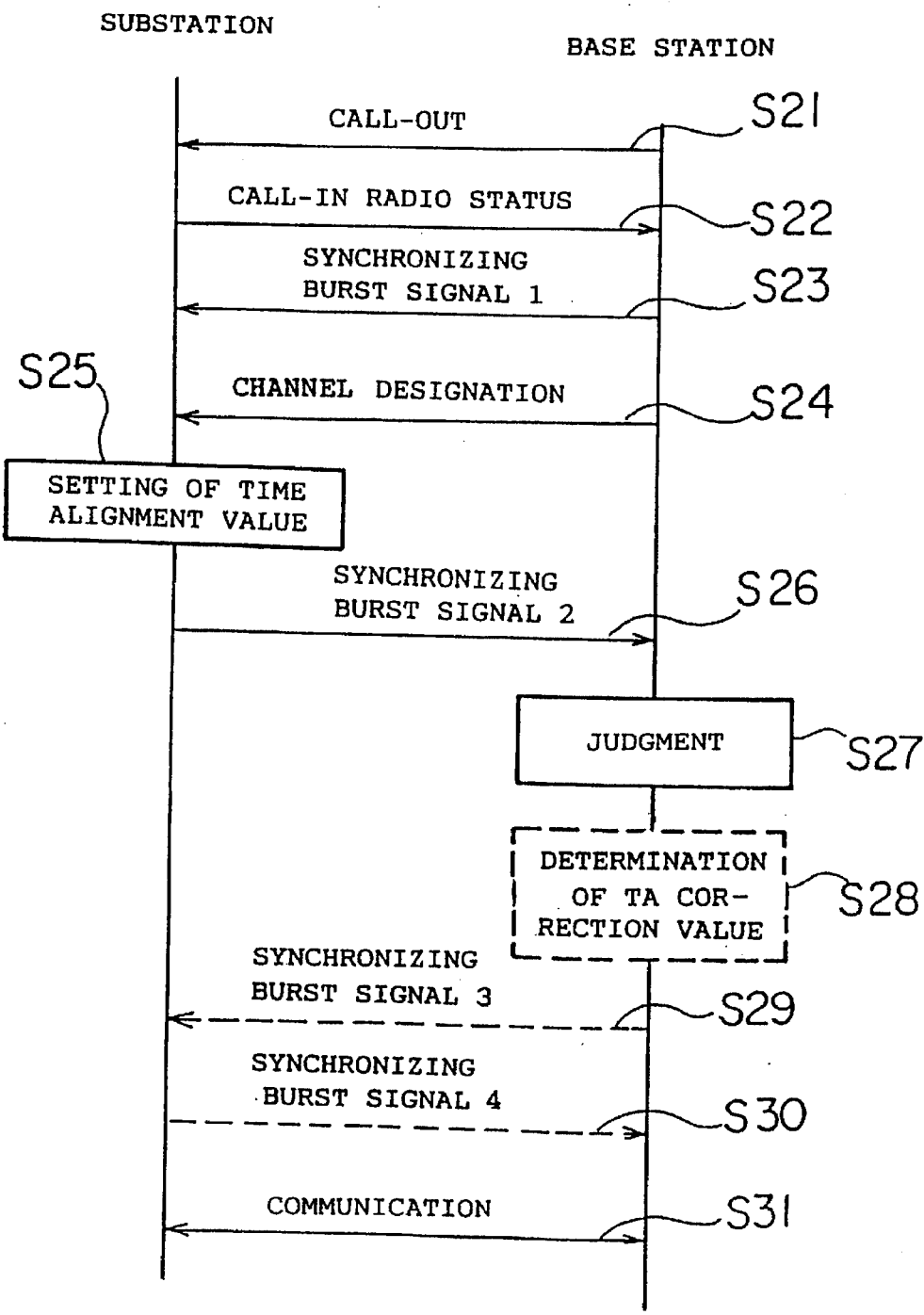
FIG. 14 is a diagram illustrating a control sequence executed at the time of call-in response.

FIG. 14 illustrates a control sequence executed by the system shown in FIG. 10 at the time of call-in response. Namely, when a call-in response signal is transmitted from a mobile station to a base station, it is first subjected to the time alignment control before being transmitted to the base station. The control sequence executed at this time is illustrated in FIG. 14.

In the call-in response control sequence, first, while in a wait state, the substation measures the received electric field strengths of radio waves then receivable from base stations. When a call-in is detected, the base station gives a calling to the mobile station via the control channel (S21), and then the mobile station notifies the base station of a call-in radio status (S22). The subsequent Steps S23 to S31 respectively correspond to and are identical with Steps S12 to S20 of the control sequence shown in FIG. 12, and therefore, description of these steps are omitted.

Thus, at the time of call-out or call-in response, data from the mobile station is transmitted accurately to a predetermined slot, and even if almost no guard time is provided for these data, the transmitted data is prevented from colliding with data transmitted to adjacent slots.

FIG. 15 is a block diagram schematically illustrating the configuration of a fifth embodiment. Also in the fifth embodiment, a mobile station can receive radio waves from a plurality of base stations. Specifically, base stations 46 and 47 are located adjacent to each other, and mobile station 48 and 49 are located within the coverage of service area of both base stations.

The base stations 46 and 47 and the mobile station 48 and 49 carry out mobile communications according to TDM/TDMA technique, and constitute a digital automobile telephone system. The substations 48 and 49 have an internal arrangement identical to that shown in FIG. 3.

The base stations 46 and 47 include storage units 46a and 47a, respectively, in each of which are stored a time alignment correlation table associated therewith, as well as correlation tables associated with neighboring base stations. FIG. 16 shows an example of such correlation tables stored in the storage unit 46a (47a) in relation to the respective stations.

In this configuration, operations associated with the call-out and call-in response are basically identical with those of the fourth embodiment described with reference to FIGS. 12 and 14; therefore, only the differences are explained below.

While in a wait state, the mobile station 48 and 49 each measure the received electric field strengths of the radio waves from the base stations 46 and 47, and transmit a call-out signal (corresponding to the call setting in S11 of FIG. 12) or a call-in response signal (corresponding to the call-in radio status in S22 of FIG. 14), which contains the measured values of received electric field strengths and the corresponding perch channel numbers, to the base stations. The base station transmits the received signal to a control station 55, which then notifies the base station of the channel to be used. The base station selects a correlation table for a base station associated with the designated channel, from among the correlation tables stored in the storage unit thereof, and transmits a channel designation signal carrying the selected correlation table data and the perch channel number to the mobile station (S13 in FIG. 12; S24 in FIG. 14).

On receiving the channel designation signal from the base station, the mobile station obtains a time alignment value corresponding to the received electric field strength of the channel specified by the perch channel number, from the correlation table contained in the received signal (S14 in FIG. 12; S25 in FIG. 14).

The subsequent process is identical to the corresponding part in the fourth embodiment (S15 et seq. in FIG. 12; S26 et seq. in FIG. 14).

Figure 17:
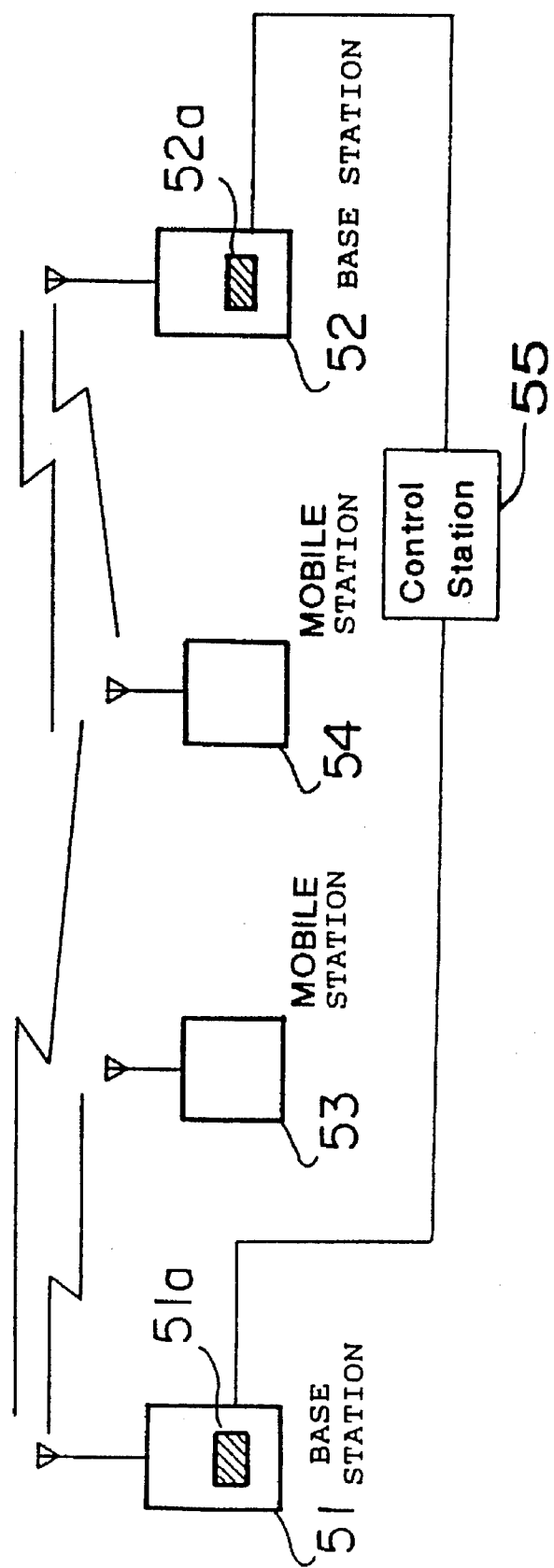
FIG. 17 is a block diagram schematically illustrating the configuration of a sixth embodiment.

FIG. 17 is a block diagram schematically illustrating the configuration of a sixth embodiment. Also in the sixth embodiment, it is assumed that a mobile station can receive radio waves from a plurality of base stations. Namely, base stations 51 and 52 are located adjacent to each other, and mobile station 53 and 54 are located within the coverage of service area of both base stations.

The base stations 51 and 52 and the mobile station 53 and 54 perform mobile communications according to TDM/TDMA technique, and constitute a digital automobile telephone system. The mobile station 53 and 54 have an internal arrangement identical to that shown in FIG. 3.

The base stations 51 and 52 include storage units 51a and 52a, respectively, in each of which are stored station parameters (perch channel number, antenna height, effective radiated power) associated thereof, as well as station parameters associated with neighboring base stations. FIG. 18 shows an example of such station parameters stored in the storage unit 51a (52a) in relation to the respective base stations. The mobile station 53 and 54 each store the transmission frequencies of the respective base stations in the EEPROM thereof.

In this configuration, operations associated with the call-out and call-in response are basically identical with those of the fourth embodiment described with reference to FIGS. 12 and 14; therefore, only the differences are explained below.

While in a wait state, the mobile station 53 and 54 each measure the received electric field strengths of the radio waves from the base stations 51 and 52, and transmit a call-out signal (corresponding to the call setting in S11 of FIG. 12) or a call-in response signal (corresponding to the call-in radio status in S22 of FIG. 14), which contains the measured values of received electric field strengths and the corresponding perch channel numbers, to the base stations. The base station transmits the received signal to a control station 55, which then notifies the base station of the channel to be used. The base station selects a set of parameters for a base station associated with the designated channel, from among a plurality of sets of station parameters stored in the storage unit thereof, and transmits a channel designation signal carrying the selected station parameters and the perch channel number to the mobile station (S13 in FIG. 12; S24 in FIG. 14).

On receiving the channel designation signal from the base station, the mobile station calculates a time alignment value according to equations (1) to (5) explained with reference to the third embodiment, based on the station parameters contained in the received signal, the received electric field strength of the base station associated with the channel specified by the perch channel number, and the transmission frequency of the base station associated with the channel specified by the perch channel number (S14 in FIG. 12; S25 in FIG. 14).

The subsequent process is identical with the corresponding part in the fourth embodiment (S15 et seq. in FIG. 12; S26 et seq. in FIG. 14).

A seventh embodiment will be now described. The seventh embodiment has a configuration basically identical with that of the fifth embodiment shown in FIG. 15.

In the seventh embodiment, operations associated with the call-out and call-in response are basically identical with those of the fourth embodiment described with reference to FIGS. 12 and 14; therefore, only the differences are explained below.

While in a wait state, mobile station each measure the received electric field strengths of the radio waves from base stations, and transmit a call-out signal (corresponding to the call setting in S11 of FIG. 12) or a call-in response signal (corresponding to the call-in radio status in S22 of FIG. 14), which contains the measured values of received electric field strengths and the corresponding perch channel numbers, to the base stations. The base station transmits the received signal to a control station 55, which then notifies the base station of the channel to be used. The base station selects a correlation table for a base station associated with the designated channel, from among a plurality of correlation tables stored in the storage unit thereof, obtains based on the selected correlation table a time alignment value corresponding to the measured value of received electric field strength of the base station associated with the designated channel, which is previously transmitted thereto, and transmits a channel designation signal carrying the time alignment value and the perch channel number to the substation (S13 in FIG. 12; S24 in FIG. 14).

On receiving the channel designation signal from the base station, the mobile station extracts the time alignment value from the received signal (S14 in FIG. 12; S25 in FIG. 14).

The subsequent process is identical with the corresponding part in the fourth embodiment (S15 et seq. in FIG. 12; S26 et seq. in FIG. 14).

An eighth embodiment will be now described. In the eighth embodiment, it is assumed that while a mobile station is communicating with a first base station, channels are switched such that the communication with a second base station is established. The configuration of the eighth embodiment is identical with that of the fourth embodiment shown in FIG. 10, and accordingly, description thereof is omitted.

Figure 19:
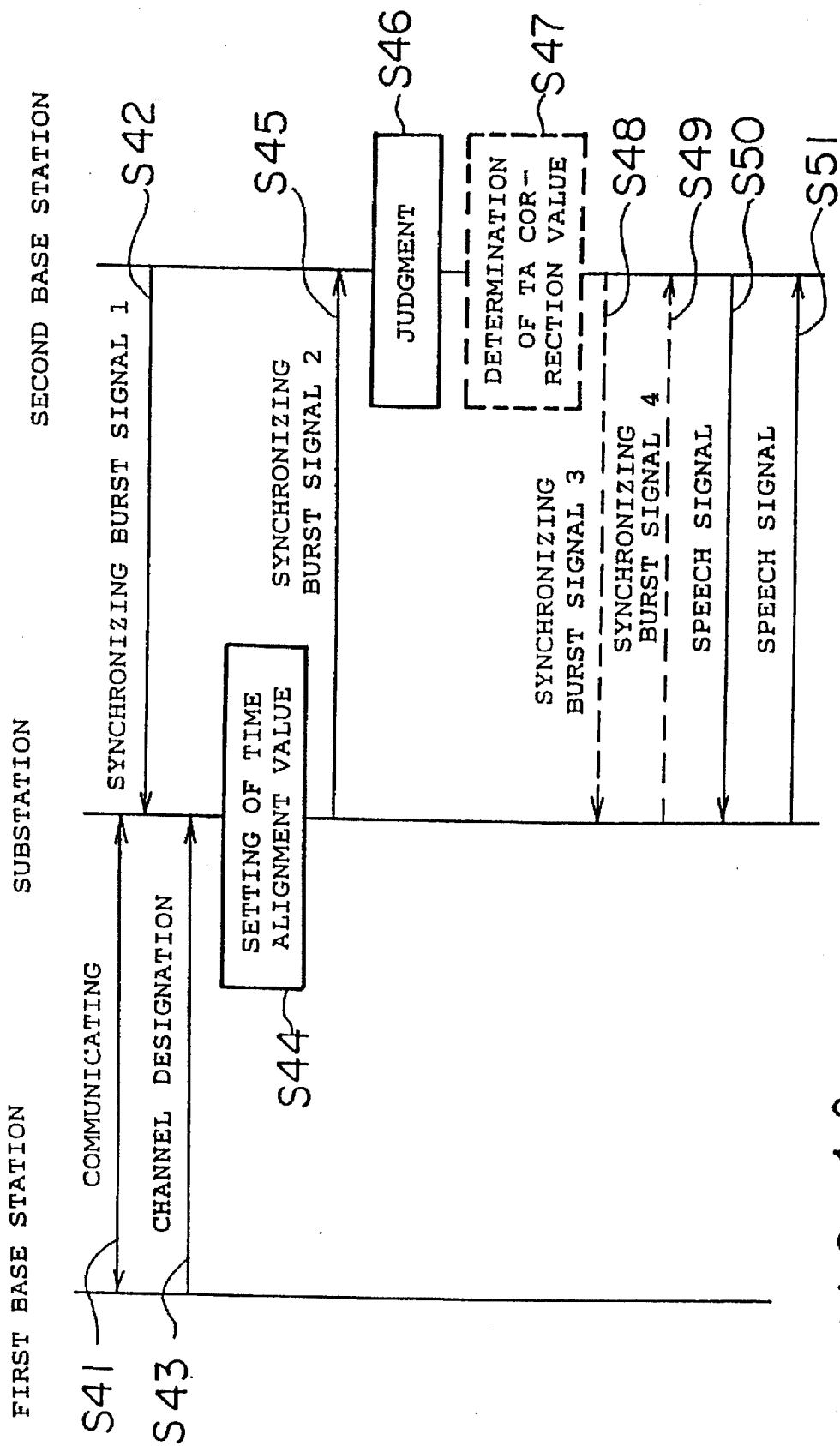
FIG. 19 is a diagram illustrating a control sequence executed at the time of channel switching.

FIG. 19 illustrates a control sequence executed at the time of channel switching in the eighth embodiment. According to this control sequence, when a synchronizing burst signal 2 is transmitted from the mobile station to the second base station to which the channel is to be switched, it is first subjected to time alignment control before being transmitted to the second base station. In FIG. 19, the numbers following "S" represent step numbers in the sequence.

During communication, the mobile station measures the received electric field strengths of radio waves then receivable from base stations (S41). When a command to switch the communication from the first base station to the second base station is transmitted from a control station to the first and second base stations, the second base station transmits a synchronizing burst signal 1 to the mobile station via a communication channel (S42), and the first base station transmits a channel designation signal specifying the channel to be switched to, to the mobile station via a control channel (S43). The channel designation signal includes a color code, a perch channel number, etc. On receiving the channel designation signal, the mobile station selects a correlation table for the second base station which is associated with the channel specified by the channel designation signal, from among a plurality of correlation tables stored in the EEPROM thereof, and reads out a time alignment value corresponding to the measured value of received electric field strength of the radio wave from the second base station (S44).

The mobile station then transmits a synchronizing burst signal 2 to the second base station to notify the same of the reception of the synchronizing burst signal 1, according to transmission timing adjusted based on the time alignment value obtained in S44 (S45). Thus, since the time alignment control is performed on the synchronizing burst signal 2, it is almost unnecessary to set a collision prevention guard time for the synchronizing burst signal 2. The synchronizing burst signal 2 transmitted to the base station contains the time alignment value used for the time alignment control.

On receiving the synchronizing burst signal 2 from the mobile station, the second base station compares the time of reception of the signal 2 with original reception timing thereof, to determine whether or not the transmission timing of the mobile station is proper (S46). In other words, it is determined whether or not a data signal, if transmitted from the mobile station on the basis of the time alignment value according to which the transmission timing of the synchronizing burst signal 2 has been adjusted, will influence the communications of other mobile station via adjacent slots of the same channel.

If it is judged that the transmission timing of the mobile station is proper, Steps S47 to S49 are skipped; accordingly, the second base station transmits a data signal to the mobile station (S50), and the mobile station transmits a data signal to the second base station according to the transmission timing adjusted based on the above time alignment value (S51), whereby communication is established.

In cases where the transmission timing of the mobile station is proper as mentioned above, Steps S47 to S49 can be skipped, thus making it possible to shorten the instantaneous disconnection of data signal occurring at the time of channel switching. The synchronizing burst signal 2 transmitted in Step S45 may be subject to slight time control error. However, since the time alignment control is carried out on the signal 2, it is highly probable that the transmission timing is judged to be proper in Step S46, and thus the instantaneous disconnection of data signal at the time of channel switching can be considerably shortened.

If it is judged in Step S46 that the transmission timing of the mobile station is not proper, a time alignment correction value is obtained such that the reception timing of the second base station coincides with the original reception timing (S47).

A synchronizing burst signal 3 carrying this time alignment correction value is transmitted to the mobile station (S48). The mobile station then transmits a synchronizing burst signal 4 to the second base station to notify the same of the reception of the time alignment correction value (S49). After S50, signal transmission from the mobile station is effected according to the transmission timing adjusted based on a corrected time alignment value which is corrected by the time alignment correction value.

In Step S47, after the time alignment correction value is obtained, it may be added to the time alignment value received in Step S45, to obtain a corrected time alignment value. In this case, in Step S48, a synchronizing burst signal 3 carrying the corrected time alignment value is transmitted to the substation.

A ninth embodiment will be now described. Also in the ninth embodiment, it is assumed that while a mobile station is communicating with a first base station, channels are switched such that the communication with a second base station is established. The configuration of the ninth embodiment is identical with that of the fifth embodiment shown in FIG. 15, and accordingly, description thereof is omitted.

The channel switching operation of the ninth embodiment is basically the same as that of the eighth embodiment shown in FIG. 19; therefore, only the differences will be described.

In the ninth embodiment, on receiving a channel switching command from a control station, the base station selects a correlation table for a base station associated with the channel to which the communication is to be switched, from among a plurality of correlation tables stored in the storage unit thereof, and transmits a channel designation signal, which specifies the channel to be switched to and contains the selected correlation table data and the perch channel number, to the substation (S43 in FIG. 19). On receiving the channel designation signal from the base station, the mobile station obtains a time alignment value corresponding to the received electric field strength of the base station associated with the channel specified by the perch channel number, from the correlation table contained in the received signal (S44 in FIG. 19).

The subsequent process is identical with the corresponding part in the eighth embodiment (S45 et seq. in FIG. 19).

A tenth embodiment will be now described. Also in the tenth embodiment, it is assumed that while a mobile station is communicating with a first base station, channels are switched such that the communication with a second base station is established. The configuration of the tenth embodiment is identical with that of the sixth embodiment shown in FIG. 17, and accordingly, description thereof is omitted.

The channel switching operation of the tenth embodiment is basically the same as that of the eighth embodiment shown in FIG. 19; therefore, only the differences will be described.

In the tenth embodiment, on receiving a channel switching command from a control station, the base station selects a set of station parameters for a base station associated with the specified channel, from among a plurality of sets of station parameters stored in the storage unit thereof, and transmits a channel designation signal, which specifies the channel to be switched to and contains the selected station parameters and the perch channel number, to the substation (S43 in FIG. 19). On receiving the channel designation signal from the base station, the mobile station calculates a time alignment value according to equations (1) to (5) explained with reference to the third embodiment, based on the station parameters contained in the received signal, the received electric field strength of the base station associated with the channel specified by the perch channel number, and the transmission frequency of the base station associated with the channel specified by the perch channel number (S44 in FIG. 19).

The subsequent process is identical with the corresponding part in the eighth embodiment (S45 et seq. in FIG. 19).

An eleventh embodiment will be now described. Also in the eleventh embodiment, it is assumed that while a mobile station is communicating with a first base station, channels are switched such that the communication with a second base station is established. The configuration of the eleventh embodiment is identical with that of the seventh embodiment, and accordingly, description thereof is omitted.

The channel switching operation of the eleventh embodiment is basically the same as that of the eighth embodiment shown in FIG. 19; therefore, only the differences will be described.

In the eleventh embodiment, during communication, the mobile station measures the received electric field strengths of radio waves from base stations, and periodically transmits the measured values of received electric field strengths and the corresponding perch channel numbers to base stations (S41 in FIG. 19). On receiving a channel switching command from a control station, the base station selects a correlation table for a base station associated with the channel to which the communication is to be switched, from among a plurality of correlation tables stored in the storage unit thereof, obtains based on the selected correlation table a time alignment value corresponding to the measured value of received electric field strength of the base station associated with the specified channel, which is previously transmitted thereto, and transmits a channel designation signal, which specifies the channel to be switched to and contains the time alignment value and the perch channel number, to the mobile station (S43 in FIG. 19).

On receiving the channel designation signal from the base station, the mobile station extracts the time alignment value from the received signal (S44 in FIG. 19).

The subsequent process is identical with the corresponding part in the eighth embodiment (S45 et seq. in FIG. 19).

Although in the foregoing embodiments, the present invention is applied to a digital automobile telephone system, it is applicable to any mobile communication system employing TDMA technique.

As described above, according to the present invention, the mobile station measures the received electric field strength of a radio wave from the base station and obtains a time alignment value based on the measured value, and the time alignment control is performed on the call-out signal, call-in response signal and location registration request signal transmitted via the control channel, as well as on the synchronizing burst signal transmitted via the communication channel at the time of channel switching. Accordingly, the guard time, which is provided for these signals for collision prevention, can be shortened, and the transmission efficiency of radio communication channels is improved.

Further, since the time alignment control is performed on the synchronizing burst signal transmitted from the mobile station at the time of channel switching, communications via adjacent slots of the same channel are scarcely affected. Accordingly, the control sequence conventionally employed for the time alignment value setting can be simplified, and thus the transmission of data signal can be immediately started. Consequently, the duration of instantaneous speech disconnection at the time of channel switching is reduced.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A mobile station apparatus for carrying out mobile communications with a base station according to TDMA technique, comprising:

storage means for storing a correlation table indicating correlation between received electric field strength and time alignment value;

measuring means for measuring a received electric field strength of a radio wave from the base station;

readout means for reading a time alignment value from the correlation table stored in said storage means, based on the received electric field strength measured by said measuring means; and transmitting means for transmitting data to the base station according to transmission timing adjusted based on the time alignment value read by said readout means.

2. A mobile station apparatus for carrying out mobile communications with a base station according to TDMA technique, comprising:

receiving/storing means for receiving a correlation table indicating correlation between received electric field strength and time alignment value from the base station, and storing the received correlation table;

measuring means for measuring a received electric field strength of a radio wave from the base station;

readout means for reading a time alignment value from the correlation table stored in said receiving/storing means, based on the received electric field strength measured by said measuring means; and transmitting means for transmitting data to the base station according to transmission timing adjusted based on the time alignment value read by said readout means.

3. A mobile station apparatus for carrying out mobile communications with a base station according to TDMA technique, comprising:

receiving means for receiving, from the base station, data indicating transmission effective radiated power and antenna height of the base station;

measuring means for measuring a received electric field strength of a radio wave from the base station;

storage means for storing a transmission frequency of the base station;

calculating means for calculating a time alignment value based on the transmission effective radiated power and the antenna height of the base station received by said receiving means, the received electric field strength measured by said measuring means, and the transmission frequency of the base station stored in said storage means; and transmitting means for transmitting data to the base station according to transmission timing adjusted based on the time alignment value calculated by said calculating means.

4. The mobile station apparatus according to any one of claims 1 to 3, wherein the transmission timing of said transmitting means is adjusted when call-out data is transmitted to the base station.

5. The mobile station apparatus according to any one of claims 1 to 3, wherein the transmission timing of said transmitting means is adjusted when a call-in response is transmitted to the base station.

6. The mobile station apparatus according to any one of claims 1 to 3, wherein the transmission timing of said transmitting means is adjusted when a location registration request is transmitted to the base station.

7. A mobile station apparatus for carrying out mobile communications with base stations according to TDMA technique, comprising:

storage means for storing correlation tables, each indicating correlation between received electric field strength and time alignment value, in relation to the respective base stations;

receiving means for receiving a channel designation signal specifying a channel;

measuring means for measuring a received electric field strength of a radio wave from a base station associated with the channel specified by the channel designation signal;

readout means for selecting a correlation table for the base station associated with the channel specified by the channel designation signal, from among the correlation tables stored in said storage means, and reading a time alignment value from the selected correlation table, based on the received electric field strength measured by said measuring means; and transmitting means for transmitting data to the base station associated with the channel specified by the channel designation signal, according to transmission timing adjusted based on the time alignment value read by said readout means.

8. A mobile station apparatus for carrying out mobile communications with base stations according to TDMA technique, comprising:

receiving/storing means for receiving a channel designation signal which specifies a channel and which includes a correlation table indicating correlation of time alignment value with received electric field strength of a base station associated with the specified channel, and storing the received correlation table;

measuring means for measuring a received electric field strength of a radio wave from the base station associated with the channel specified by the channel designation signal;

readout means for reading a time alignment value from the correlation table stored in said receiving/storing means, based on the received electric field strength measured by said measuring means; and transmitting means for transmitting data to the base station associated with the channel specified by the channel designation signal, according to transmission timing adjusted based on the time alignment value read by said readout means.

9. A mobile station apparatus for carrying out mobile communications with base stations according to TDMA technique, comprising:

receiving means for receiving a channel designation signal which specifies a channel and which includes data indicating transmission effective radiated power and antenna height of a base station associated with the specified channel;

measuring means for measuring a received electric field strength of a radio wave from the base station associated with the channel specified by the channel designation signal;

readout means for storing transmission frequencies of a plurality of base stations, and reading the transmission frequency of the base station associated with the channel specified by the channel designation signal, from among the transmission frequencies stored therein;

calculating means for calculating a time alignment value based on the data of the transmission effective radiated power and the antenna height contained in the channel designation signal received by said receiving means, the received electric field strength measured by said measuring means, and the transmission frequency read by said readout means; and transmitting means for transmitting data to the base station associated with the channel specified by the channel designation signal, according to transmission timing adjusted based on the time alignment value calculated by said calculating means.

10. A mobile station apparatus for carrying out mobile communications with base stations according to TDMA technique, comprising:

measuring means for measuring respective received electric field strengths of radio waves receivable from a plurality of base stations;

electric field strength transmitting means for transmitting data of the respective received electric field strengths measured by said measuring means to the base stations;

receiving means for receiving a channel designation signal which specifies a channel and which includes a time alignment value for a base station associated with the specified channel, from the base station associated with the specified channel; and transmitting means for transmitting data to the base station associated with the channel specified by the channel designation signal, according to transmission timing adjusted based on the time alignment value in the channel designation signal received by said receiving means.

11. The mobile station apparatus according to any one of claims 7 to 10, wherein the channel specified by the channel designation signal is a channel which is specified for call-out or call-in response operation, and the transmission timing of said transmitting means is adjusted when call-out data or call-in response is transmitted to the base station associated with the specified channel.

12. The mobile station apparatus according to any one of claims 7 to 10, wherein the channel specified by the channel designation signal is a channel to which communication is to be switched during the communication, and the transmission timing of said transmitting means is adjusted when data are transmitted to the base station associated with the specified channel.

13. The mobile station apparatus according to any one of claims 7 to 10, wherein said transmitting means includes time alignment value transmitting means for transmitting the time alignment value according to which the transmission timing is adjusted, to the base station associated with the channel specified by the channel designation signal.

14. A base station apparatus for carrying out mobile communications with a plurality of mobile stations according to TDMA technique, comprising:

storage means for storing correlation tables, each indicating correlation between received electric field strength and time alignment value, in relation to respective base stations;

receiving means for receiving, from a mobile station, data indicating received electric field strengths of radio waves transmitted from the base station apparatus and base stations near the mobile station; and transmitting means for reading a correlation table for a base station associated with a channel specified by a control station, from among the correlation tables stored in said storage means, and transmitting a channel designation signal which includes data of the specified channel and the read correlation table to the mobile station.

15. A base station apparatus for carrying out mobile communications with a plurality of mobile stations according to TDMA technique, comprising:

storage means for storing base station data including transmission effective radiated power and antenna height, in relation to each of base stations;

receiving means for receiving, from a mobile station, data indicating received electric field strengths of radio waves transmitted from the base station apparatus and base stations near the mobile station; and transmitting means for reading data about a base station associated with a channel specified by a control station, from among the base station data stored in said storage means, and transmitting a channel designation signal which includes data of the specified channel and the read base station data to the mobile station.

16. A base station apparatus for carrying out mobile communications with a plurality of mobile stations according to TDMA technique, comprising:

storage means for storing correlation tables, each indicating correlation between received electric field strength and time alignment value, in relation to respective base stations;

receiving means for receiving, from a mobile station, data indicating received electric field strengths of radio waves transmitted from the base station apparatus and base stations near the mobile station;

selecting means for selecting a correlation table for a base station associated with a channel specified by a control station, from among the correlation tables stored in said storage means, and selecting data of the received electric field strength of the radio wave transmitted from the base station associated with the channel specified by the control station, from among the data received by said receiving means; and transmitting means for reading a time alignment value from the correlation table selected by said selecting means, based on the data of the received electric field strength selected by said selecting means, and transmitting a channel designation signal which includes data of the specified channel and the time alignment value to the mobile station.

17. The base station apparatus according to any one of claims 14 to 16, further comprising correcting means for obtaining a time alignment correction value for reception timing, based on a signal which is transmitted from the mobile station after being subjected to time alignment control, and correction value transmitting means for transmitting the time alignment correction value obtained by said correcting means to the mobile station.

18. The base station apparatus according to any one of claims 14 to 16, further comprising determining means for checking reception timing of a signal which is transmitted from the mobile station after being subjected to time alignment control, to determine whether or not the reception timing influences communications via adjacent slots of the specified channel, and data signal transmitting means for permitting a data signal to be transmitted from the mobile station when said determining means judges that the reception timing does not influence the communications via the adjacent slots.

19. The base station apparatus according to any one of claims 14 to 16, further comprising determining means for checking reception timing of a signal which is transmitted from the mobile station after being subjected to time alignment control, to determine whether or not the reception timing influences communications via adjacent slots of the specified channel, correcting means for obtaining a time alignment correction value when said determining means judges that the reception timing influences the communications via the adjacent slots, and correction value transmitting means for transmitting the time alignment correction value obtained by said correcting means to the mobile station.

* * * * *